US005396226A

United States Patent [19]

Wake et al.

[11] Patent Number: 5,396,226

[45] Date of Patent: Mar. 7, 1995

[54] IDENTIFICATION CODE INPUT BOARD FOR ELECTRICAL EQUIPMENT INCLUDING ELECTRICAL LOCKS

[75] Inventors: Hideo Wake, Yokohama; Katsufumi Naka, Watarai, both of Japan

[73] Assignee: Miwa Lock Co., Ltd., Tokyo, Japan

[21] Appl. No.: 70,992

[22] Filed: Jun. 4, 1993

[30] Foreign Application Priority Data

Jun. 13, 1992 [JP] Japan .................................. 4-179033

[51] Int. Cl.$^6$ ................................................ H04Q 1/00

[52] U.S. Cl. .......................... 340/825.31; 340/825.56; 341/22; 341/23; 345/172; 345/173

[58] Field of Search ...................... 340/825.31, 825.56, 340/543; 341/22, 23, 31; 345/170, 172, 173

[56] References Cited

U.S. PATENT DOCUMENTS 4,857,914 8/1989 Thrower ........................ 340/825.31
5,274,370 12/1993 Morgan et al. ............... 340/825.31

*Primary Examiner*—Michael Horabik
*Attorney, Agent, or Firm*—Wenderoth, Lind & Ponack

[57] ABSTRACT

An identification code input board for activating electrical equipment such as an electrical lock includes: a display panel crosswise arranged in the form of M lines X N rows while including a plurality of display sections to display a group of codes of which number is represented by a numeral of m X n, a transparent key switch sheet superimposed on the front surface of the display panel while including a plurality of switches arranged corresponding to the display sections, a display converter for selecting one of plural kinds of display formats, of which number is represented by a numeral of (M−m+1) X (N−n+1), every time the electrical equipment is actuated, and a code reader adapted to output a digitized code signal for distinguishing a selected code, wherein each of m and n is a positive integral number of two or more and each of M X N is a positive integral number larger than that of m and n respectively. In response to a coordinate signal outputted from the transparent key switch sheet superimposed on the front surface of the display panel, a microcomputer is activated to properly actuate an electromagnetic actuator for actuating the electrical equipment.

7 Claims, 3 Drawing Sheets

IDENTIFICATION CODE INPUT BOARD FOR ELECTRICAL EQUIPMENT INCLUDING ELECTRICAL LOCKS

BACKGROUND OF THE INVENTION

1. Field of the Invention

The present invention relates generally to an identification code input board employable for an electrical lock, an activating unit for electrical equipment or the like. More particularly, the present invention relates to an identification code input board (hereinafter referred to simply as an input board) having substantially improved characteristics.

2. Description of the Related Art

When an electrical lock is locked or unlocked, usually, an identification code is first inputted into an input board placed on the inlet side of a door, and thereafter, a predetermined number of handling steps are executed by a user's hand.

Usually, the input board includes a plurality of light emitting diodes (hereinafter referred to simply as LEDs) adapted to display ten arabic numerals 0 to 9 and two control codes in each of, e.g., twelve display sections arranged in the form of 4 lines X 3 rows, and each display is fed to a control circuit in the electrical lock in the form of a code via a transparent key switch panel superimposed on the LED by depressing one of keys on the key switch panel with a user's finger.

As the input board is repeatedly used for a short time, a problem arises in that the content of the identification code is undesirably perceived by a third person in the presence of sweat and/or oils adhering to the key switch panel. In addition, there is a possibility that the content of the identification code is likewise undesirably perceived by the third person based on a functional injury (e.g.-wear), a frictional scratches or the like caused on the key switch panel as the input board is repeatedly used for a long time. Thus, since the conventional input board is constructed in the above-described manner, there is a danger that the content of the identification code is readily known by a third person based on mathematic permutations and combinations made by himself for searching for the identification code specifically allocated to the input board.

To obviate the foregoing malfunctions, a proposal has been made with respect to an input board which is constructed such that an arrangement pattern of codes on a display panel is caused to randomly or regularly vary every time an actuating unit for actuating the electrical equipment, such as an electrical lock, is activated, and the thus proposed input board is put in practical use.

With the proposed input board, it is certain that there does not arise a malfunction that the content of the identification code specifically allocated to the input board is undesirably perceived by a third person based on a functional injury, scratches or the like caused on the front surface of a key switch panel as the input board is repeatedly used for a long time. However, since the display position of the identification code on the key switch panel is caused to vary every time an actuation unit, e.g., an electromagnetic actuator or the like for actuating the electrical lock, is activated, it is inconvenient to use the prior art input board.

SUMMARY OF THE INVENTION

The present invention has been made in consideration of the foregoing background.

An object of the present invention is to provide an identification code input board employable for electrical equipment including an electrical lock in which the content of an identification code is not undesirably perceived by a third person in the presence of sweat and/or oils adhering to a display panel as the identification code input board is repeatedly used for a short time.

Another object of the present invention is to provide an identification code input board in which the content of the identification code is not undesirably perceived by the third person based on wear, or scratch or the like caused on the front surface of the display panel as the identification code input board is repeated used for a long time.

Further object of the present invention is to provide an identification code input board in which the content of the identification code is not readily known by any unauthorized person based on mathematic permutations and combinations made by himself for searching for the identification code specifically allocated to the identification code input board.

The present invention provides an identification code input board for actuating electrical equipment, wherein the identification code input board comprises a display panel crosswise arranged in the form of M lines X N rows which including a plurality of display sections, of which number is represented by a numeral of M X N, to display a group of codes, of which number is represented by a numeral of m X n, and which are extensively developed in accordance with a predetermined arrangement pattern in the form of m lines X n rows where each of m and n is a positive integral number of two or more and each of M and N is a positive integral number respectively larger than that of m and n, the display panel including a non-display section around the display sections having the group of codes displayed thereon; a transparent key switch sheet superimposed on the display panel on the front side of the latter while including a plurality of switches arranged corresponding to the display section of which number is represented by a numeral of M X N; a display converter unit for selecting one of plural kinds of display formats, of which number is represented by a numeral of $(M-m+1) X (N-n+1)$, every time the electrical equipment actuated, while the arrangement pattern for the group of codes, of which number is represented by a numeral of m X n, is kept unchanged; a code reader for outputting a digitized code signal for distinguishing a selected code when a user's finger is brought in contact with one of the display sections having the selected code displayed thereon while maintaining one of the display formats for one of the group of codes of which number is represented by a numeral of m X n.

In practical use, in response to a coordinate signal outputted from the transparent key switch superimposed on the display panel, a microcomputer is activated to properly actuate an electromagnetic actuator for actuating the electrical equipment.

Usually, the microcomputer includes a microprocessor serving as a central processing unit, a memory serving as a storage unit and an interface serving as an input/output signal processing unit.

The coordinate signal outputted from the transparent key switch sheet is inputted into the display panel via the microcomputer and a common driver.

The display converting unit and the code reading unit are electrically connected to the display panel to generate a code signal which in turn is temporarily stored and subsequently processed to create an identification code to be specifically input to the identification code input board.

Usually, a group of codes are composed of a combination of some of a plurality of numerals with some of a plurality of alphabetic or similar symbols.

With the input board constructed in the above-described manner, a group of codes of which number is represented by a numeral of m X n are caused to move within the range defined by the display panel including a plurality of display sections, of which number is represented by a numeral of M X N, with the aid of the display converting unit while the arrangement pattern of the group of codes is kept unchanged. At this time, a non-display section appears around the display sections which serve to display the group of codes thereon.

When significant consideration is placed on a specific code among the group of codes of which number is represented by a numeral of m X n, since the relative position of the specific code is kept constant in the group of codes although the display position of the specific code is caused to vary within the range defined by the display panel, the specific code can easily be searched for with the input board in the same manner as the conventional input board.

In addition, when significant consideration is placed on another specific code among the group of codes of which number is represented by a numeral of m X n, since the display position of the specific code on the display panel is caused vary within the range defined by the display panel every time the electrical lock is actuated, an output signal from the transparent key switch sheet, i.e., a coordinate signal representing the coordinate position of the specific code on the display panel is caused to likewise vary within the range defined by the display panel. Thus, the coordinate signal varies in various manners of which number is represented by a numeral of (M−m+1) X (N−n+1).

When it is assumed that a coordinate signal outputted from the transparent key switch sheet superimposed on the front surface of the display panel is used as a code signal as is, code signals of plural kinds, of which number is represented by a numeral of (M−m+1) X (N−n+1), are generated with respect to a single identification code.

Since the input board includes a code reading unit according to the present invention, each code signal having a certain code specifically allocated thereto does not vary no matter how the position of the code on the display panel varies.

The code signals each read from the display panel with the aid of the code reading unit are successively fed to a controlling circuit in the microcomputer for the electrical equipment.

Other objects, features and advantages of the present invention will become apparent from reading of the following description which has been made in conjunction with the accompanying drawings.

BRIEF DESCRIPTION OF THE DRAWINGS

The present invention is illustrated in the following description in which.

DESCRIPTION OF THE PREFERRED EMBODIMENTS

The present invention will now be described in detail hereinafter with reference to the accompanying drawings which illustrate an identification code input board (hereinafter referred to simply as an input board) actuating for an electrical lock, for example, constructed according to an embodiment of the present invention.

Figure 1:
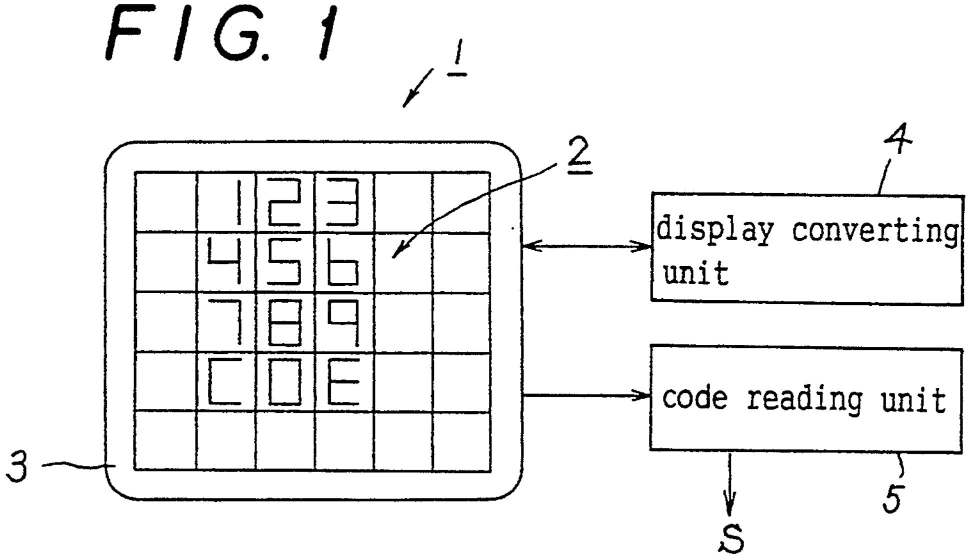
FIG. 1 is a block diagram of an identification code input board employable for an electrical lock constructed according to an embodiment of the present invention.

In FIG. 1, reference numeral 1 designates an input board to which the present invention is applied. Arabic numerals, Japanese alphabetic symbols (hiragana or katakana) and ordinary alphabetic symbols are employable for the input board as identification codes for the electrical lock. In this embodiment, a description follows with respect to the input board having twelve codes comprising ten numerals 0 to 9 and two alphabetic symbols C and E employed therefor in the same manner as the conventional input board.

Figure 2:
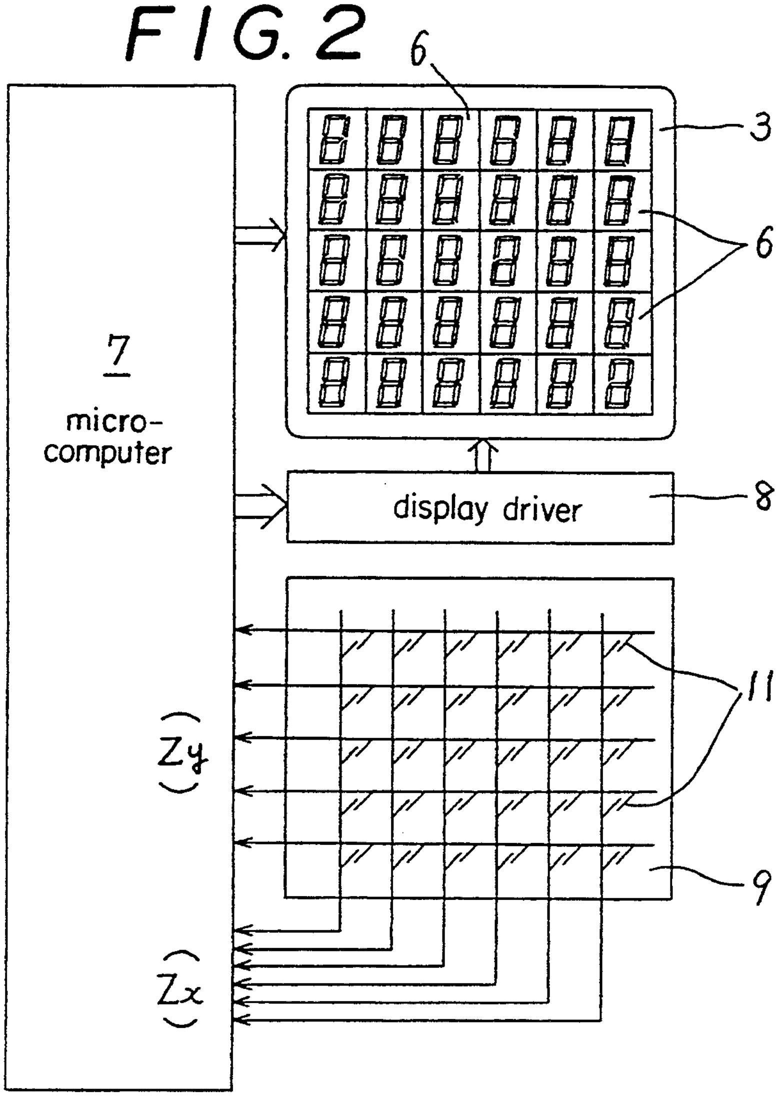
FIG. 2 is a block diagram of the identification code input board, particularly showing the structure of a display panel for the identification code input board.

In FIG. 2, reference numeral 3 designates a display panel. The display panel 3 includes thirty display sections 6 of which number is represented by a numeral of five lines X six rows. Here, it is assumed that each display section 6 is composed of seven light emitting diodes (hereinafter referred to simply as LEDS). It is obvious that the display screen of the display panel 3 may be prepared in the form of a liquid crystal display screen.

Each display section 6 can display one of the ten arabic numerals 0 to 9 and the two alphabetic symbols C and E by selectively activating some of the LED elements. As shown in FIG. 1, the total twelve codes constitute a Group of codes 2 arranged in accordance with a predetermined arrangement pattern defined by four lines X three rows.

The display panel 3 is controlled by a microcomputer 7 and a display common driver 8 each of which will be described later. The microcomputer 7 and the display common driver 8 controllably drive only twelve display sections 6 among the total thirty display sections 6.

A transparent key switch sheet 9 is superimposed on the front surface of the display panel 3. A total of thirty switches 11 are crosswise arranged on the transparent key switch sheet 9 corresponding to the display sections 6 on the display panel 3.

When a user's finger is brought in contact with the code displayed on the display section 6 or the code depressed by the user's finger, one of the switches 11 superimposed on the display panel 3 is turned off, causing a coordinate signal representing the actuated switch 11 to be fed to the microcomputer 7. On receipt of the coordinate signal, a user can know with the aid of the microcomputer 7 which one of the thirty display sections 6 is selected.

Since the structure of the display panel 3 and the transparent key switch 9 is substantially same as that of the conventional input board, a repeated description will not be required.

As shown in FIG. 1, the input board 1 includes a display converting unit 4 and a code reading unit 5 both of which are constructed by electrical circuits. Usually, the electrical lock electrically detects the processing state of the identification code inputted into the input board 1, the opened/closed state of a door and the locked/unlocked state of the electrical lock with the aid of the microcomputer 7. With such detection, an electrical signal is outputted from the electrical lock to the microcomputer 7, and subsequently, in response to the electrical signal, the microcomputer 7 controls the electrical lock on the total basis. For this reason, it is practically desirable that the display converting unit 4 and the code reading unit 5 serve as a part of the microcomputer 7.

Figure 3:
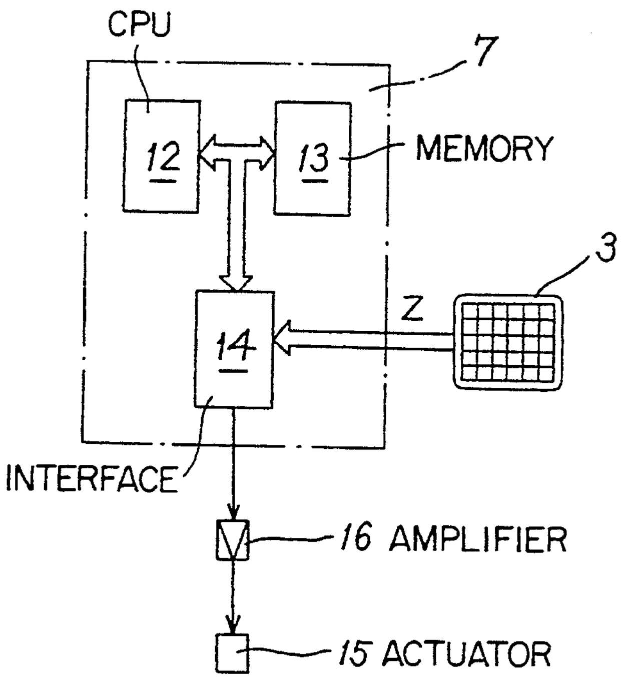
FIG. 3 is a block diagram which schematically shows essential components constituting a control unit for the displaying panel of the electrical lock.

As shown in FIG. 2 and FIG. 3, a coordinate signal Z outputted from the transparent key switch sheet 9 is fed to the microcomputer 7. As is best seen in FIG. 3, the microcomputer 7 includes a microprocessor (central processing unit) 12, a memory (storage unit) 13 and an interface (input/output signal processing circuit) 14 as main components.

The electrical lock includes an electromagnetic actuator 15 which is adapted to receive a locking/unlocking signal from the microcomputer 7 via an amplifier 16 so as to perform a predetermined locking/unlocking operation. Usually, the electrical lock feeds a signal to the microcomputer which represents the opened/closed state of the door or the locked/unlocked state of the electrical lock, in order to properly control a building having the electrical lock installed therefor on the total basis. However, since the foregoing control does not form any part of the present invention, a detailed description will not be required.

Figure 4:
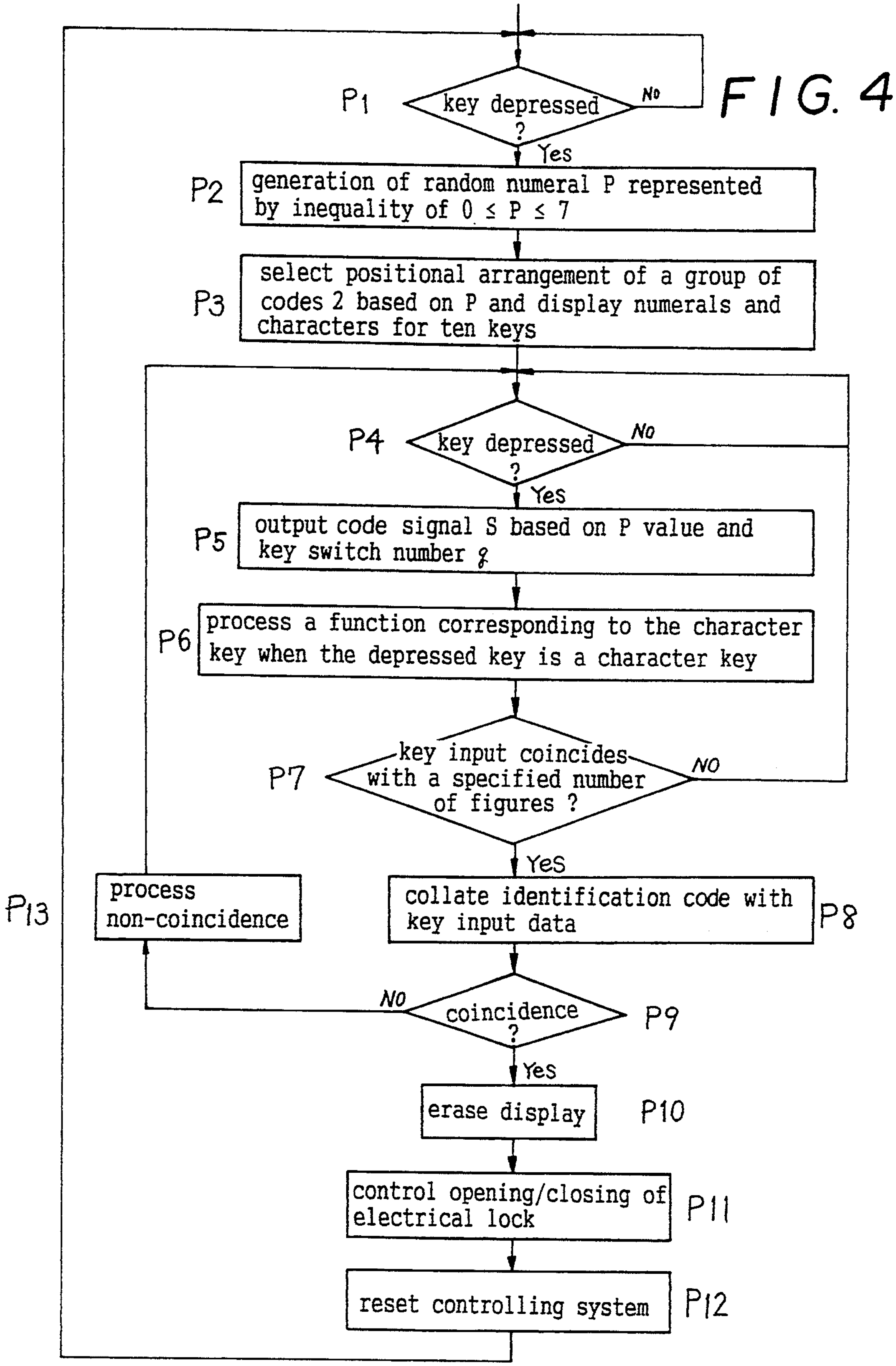
FIG. 4 is a flowchart which shows a series of steps to be executed by a microcomputer for controlling the controlling unit for the electrical lock.

To properly control the electrical lock, the microcomputer 7 executes a series of steps represented by the flowchart shown in FIG. 4. In the drawing, reference characters P1 to P13 designate a plurality of steps to be executed by the microcomputer 7.

Next, a mode of operation of the electrical lock including the input board 1 is described below with reference to FIG. 4.

Prior to a description of the flowchart, the basic technical concept of the display converting unit 4 and the code reading unit 5 associated with the input board 1 is briefly described below.

First, consideration is taken as to how many kinds of display patterns are available in the display panel 3 while the arrangement pattern of a group of codes 2 is kept unchanged.

To this end, a certain code among the group of codes 2, e.g., an arabic numeral 1 is taken into account, and subsequently, the range, where the arabic numeral 1 moves within the range defined by the display panel 3 while the arrangement pattern of the group of codes 2 is kept unchanged, is counted.

In the embodiment as 'shown in FIG. 1, the range where the arabic numeral 1 moves within the range of the display panel 3 is limited only to eight display sections 6 of which number is represented by a numeral of two lines X four rows at the left upper corner of the display panel 3. To distinguish the eight display sections 6 from other ones, a section number p (not shown) designated by numerals 0 to 7 is allocated to each of the eight display sections 6.

A section number p is randomly generated by first key touch in response to an input of the identification code into the microcomputer 7, and subsequently, a numeral 1 is placed on the display section 6 where the section number p is generated in that way.

At this time, since other numerals and the alphabetic symbols C and E are held in the relative positional relationship relative to the numeral 1, they are automatically received in the corresponding display sections 6.

For example, such a software that a numeral 2 is allocated adjacent to the numeral 1 rightward of the same, a numeral 2 is located adjacent to the numeral 1 rightward of the same and a numeral 4 is located adjacent to the numeral 1 downward of the same as shown in FIG. 1 can easily be produced by any expert in the art.

Figure 5:
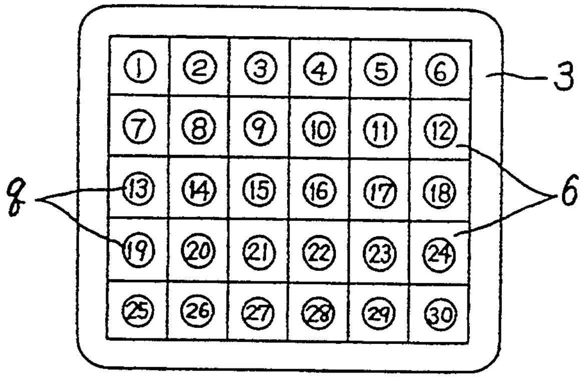
FIG. 5 is an illustrative front view of the display panel for explaining a plurality of key switch numbers.

At this time, as shown in FIG. 5, key switch numbers q designated by numerals 1 to 30 are allocated to all the display sections 6 on the display panel 3, and a digitized code signal S is temporarily stored in a q memory among thirty q memories (not shown) disposed corresponding to the respective key switch numbers q in order to distinguish a certain code from other ones while a key switch number q of the display section 6 for displaying a numeral or alphabetic symbols belonging to the group of codes 2 is taken as an address. Incidentally, the key switch number q corresponding to the coordinate signal Z outputted from the transparent key switch 9 in the one-to-one relationship. Alternatively, the coordinate signal Z may be substituted for the key switch number q.

When a certain code on the input board 1 is specifically designated by a user's finger, the key switch number q corresponding to the display section 6 having the foregoing code displayed thereon is derived from the transparent key switch 9, whereby a code signal S can be read from the q memory while the q memory is taken as an address.

Here, a series of steps shown in the flowchart will be described below.

Controlling/calculating of the microcomputer 7 is automatically started after a power source for the electrical lock is turned on, whereby the program goes to Step P1 in which the microcomputer 7 is held in the waiting state.

In Step P1, the microcomputer 7 checks whether or not the switches 11 on the transparent key switch sheet 9 are actuated. When a certain switch 11 is depressed, i.e., one of the thirty switches 11 is depressed, the program goes to Step P2 in which a certain numeral among the eight numerals 0 to 7 is designated as a section number p.

To generate this section number p, it is required that the eight numerals of 0 to 7 are always generated for a predetermined period of time so that an output from a counter (not shown) is sampled in such a timing relationship that the transparent key switch sheet 9 is initially depressed.

Otherwise, the eight numerals of 0 to 7 are randomly stored in a read only memory so that each of the eight numerals is successively read while its address is changed every time the transparent key switch 9 is initially depressed.

When the section number p is obtained in Step P2, the program goes to Step P3 in which a display manner for the group of codes 2 is selected corresponding to the section number p. Specifically, as mentioned above, e.g., a numeral 1 is first placed on the display section 6 corresponding to the section number p, and subsequently, other numerals and alphabetic symbols are successively placed on the corresponding display sections 6 depending on the relative positional relationship relative to the numeral 1. This causes the operation of the display converting unit 4 to be terminated.

Next, the program goes to Step P4 in which the microcomputer 7 waits for an input of the certain identification code into the microcomputer 7. When the display section 6 having the selected code displayed thereon is depressed by a user's finger, the program goes to Step P5 in which a code signal S representing the code selected from the section number p and the key switch number q is outputted from the microcomputer 7.

Specifically, as mentioned above, the code signal S temporarily stored in the q memory is read from the q memory while the key switch number q is taken as an address.

In case that a display section 6 other than the display section 6 having the group of codes 2 displayed thereon is designated by the microcomputer 7, no code signal is generated at this time.

When the display code is an alphabetic symbols C or E, the program goes to Step P6 in which the function allocated to this alphabetic symbols is processed by the microcomputer 7. Thus, the operation of the code reading unit 5 is terminated.

Incidentally, Step P7 to Step P13 are concerned with a process of processing the code signal S derived from the input board 1 constructed according to the embodiment of the present invention and do not form any part of the present invention. For this reason, these steps will briefly be described below.

In Step P7, the microcomputer 7 counts the number of generations of the code signal S. For example, in case that the given identification code is to be represented by a numeral of four figures, when it is found that the identification code does not assume a numeral of four figures, the program returns to Step P4 in which the microcomputer 7 is held in the waiting state until a next input is taken in the microcomputer 7. On the contrary, when it is found that the identification code assumes a numeral of four figures, the program goes to Step P8 and Step P9 in which the inputted identification code is collated with the preliminarily registered identification code.

When the inputted identification code coincides with the preliminarily registered identification code, the program goes to Step P10 in which the display appearing on the display panel 3 is erased, and subsequently, the program goes to Step P11 in which electricity is fed to the electromagnetic actuator for the electrical lock for locking or unlocking the electrical lock. Alternatively, the feeding of electricity to the electromagnetic actuator for the electrical lock may be interrupted.

Next, the program goes to Step P12 in which all the control circuits are restored to the original state, and thereafter, the program returns to Step P1 in which the microcomputer 7 is ready to execute subsequent actuation of the electrical lock.

In case that it is found in Step P9 that the inputted identification code does not coincide with the preliminarily registered identification code, the program goes to Step P13 sideward of Step P9. In Step P13, the microcomputer 7 executes the processing preset to be executed in case of the foregoing non-coincidence, and thereafter, the program returns to Step P4 in which the microcomputer 7 is ready to receive an input for correcting the identification code which does not coincide with the preliminarily registered identification code.

As is apparent from the above description, according to the present invention, since a group of codes represented by a numeral of m X n are caused to move within the range defined by the display panel for the purpose of displaying, there does not arise a malfunction that frictional injury occurs only on a certain surface of the display section or undesirable contamination adheres to the foregoing surface even though the same identification code is used by a specific user for a long time. Thus, there is no possibility that the identification code constructed by mathematic permutations and combinations is unexpectedly known by a third person. Consequently, the security of the electrical lock can substantially be improved.

Further, since the group of codes represented by a numeral of m X n are caused to move within the range defined by the display panel while the arrangement pattern of the codes is kept unchanged, only the substantially same time as that of the conventional input board is required for searching for the selected code, resulting in the input board of the present invention being used with excellent practical convenience.

While the present invention has been described above merely with respect to a single preferred embodiment thereof, it should of course be understood that the present invention should not be limited only to this embodiment but various change or modification may be made without departure from the scope of the invention as defined by the appended claims. For example, an electrical lock is only one example of a piece of electrical equipment which may be actuated by an identification code input board in accordance with the present invention.

What is claimed is:

1. An identification code input board for actuating electrical equipment comprising:

a display panel crosswise arranged in the form of M lines X N rows while including a plurality of display sections, of which number is represented by a numeral of M X N, to display a group of codes, of which number is represented by a numeral of m X n, and which are extensively developed in accordance with a predetermined arrangement pattern in the form of m lines X n rows where each of m and n is a positive integral number of two or more and each of M and N is a positive integral number larger than that of m and n respectively, said display panel including a non-display section around said display sections having said group of codes displayed thereon;

a transparent key switch sheet superimposed on a front side of said display panel while including a plurality of switches arranged corresponding to said display sections of which number is represented by numeral M X N;

a display converter for selecting one of a plurality of display formats, of which number is represented by a numeral of (M−m+1) X (N−n+1), every time the electrical equipment is actuated, while said arrangement pattern for said group of codes, of which number is represented by a numeral m X n, is kept unchanged, and a code reader for outputting a digitized code signal for distinguishing a selected code when a user's finger is brought in contact with one of said display sections having said selected code displayed thereon while maintaining one of said display formats for one of said group of codes of which number is represented by a numeral of m X n.

2. The identification code input board according to claim 1, wherein in response to a coordinate signal outputted from said transparent key switch sheet, a microcomputer is activated to properly actuate an electromagnetic actuator for actuating the electrical equipment.

3. The identification code input board according to claim 2, wherein said microcomputer includes a microprocessor serving as a central processing unit, a memory serving as a storage unit and an interface serving as an input/output signal processing unit.

4. The identification input code board according to claim 2, wherein said coordinate signal outputted from said transparent key switch sheet is transmitted to said electromagnetic actuator via an interface and an amplifier.

5. The identification code input board according to claim 2, wherein said coordinate signal outputted from said transparent key switch is inputted to said display panel via said microcomputer and a display common driver.

6. The identification code input board according to claim 1, wherein said display converter and said code reader are electrically connected to said display panel to generate a code signal which in turn is temporarily stored and subsequently processed to create an identification code to be input to said identification code input board.

7. The identification code input board according to claim 1, wherein said group of codes are composed of a combination of some of a plurality of numerals with some of a plurality of alphabetic symbols.

* * * * *